US006286377B1

(12) United States Patent
Benke et al.

(10) Patent No.: US 6,286,377 B1
(45) Date of Patent: Sep. 11, 2001

(54) METHOD AND APPARATUS FOR TESTING SPRING POWERED SWITCHES

(75) Inventors: James J. Benke; Francois J. Marchand, both of Pittsburgh; Norman Davis, Irwin; Nagar J. Patel, Pittsburgh, all of PA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/267,525

(22) Filed: Mar. 12, 1999

(51) Int. Cl.[7] ........................................ G01D 9/38

(52) U.S. Cl. ........................................ 73/865.9

(58) Field of Search ........................ 73/865.9, 865.3

(56) References Cited

U.S. PATENT DOCUMENTS

| | | | |
|---|---|---|---|
| 3,183,599 * | 5/1965 | Byrd et al. | 73/865.9 |
| 5,671,161 * | 9/1997 | Bennet et al. . | |
| 5,726,367 | 3/1998 | Patel et al. | 73/865.9 |

OTHER PUBLICATIONS

Berger et al., "Maintenance–Free Vacuum Circuit–Breaker", The Reliability of Transmission and Distribution Equipment, IEEE Conference Publication No. 406, 6 pp., Mar. 29–31, 1995.

N. Anger et al., "Diagnostics/Monitoring for Medium–Voltage Components and Systems", pp. 1.14.1–1.14.4, No date.

* cited by examiner

*Primary Examiner*—Robert Raevis
(74) *Attorney, Agent, or Firm*—Martin J. Moran

(57) ABSTRACT

Operation of a medium voltage spring powered circuit breaker is analyzed by determining the linear position of a selected driven part of the circuit breaker operating mechanism. When the charged closing springs of the operating mechanism are released, the selected driven part, such as a vacuum interrupter stem or push rod, moves to a new linear position as actuated by the release of the charged closing springs. Linkages are provided to the driven parts. LVDT sensors engage each of the linkages to determine the linear positions of the driven parts. A processing unit collects operation data for the operating mechanism when the charged closing springs are released to actuate and produce linear movement of the driven parts. The operation data includes a plurality of the linear positions of the driven parts. A microprocessor-based routine and interface outputs the operation data.

23 Claims, 4 Drawing Sheets

METHOD AND APPARATUS FOR TESTING SPRING POWERED SWITCHES

BACKGROUND OF THE INVENTION

1. Field of the Invention

This invention relates to testing of the mechanical operation of spring powered switches such as medium voltage circuit breakers.

2. Background Information

Switches carrying sizable electric currents, such as medium voltage circuit breakers, require substantial mechanical forces to operate the switch rapidly and to hold the contacts closed against the magnetic repulsion forces generated by the current. In a typical medium voltage circuit breaker, a set of charged closing springs is released to close the breaker and to charge an opening spring which, in turn, is later released to open the breaker. The speed at which the mechanism operates is so rapid that it is difficult to identify the nature of any malfunctions, or even in some cases, to discern that the breaker is not operating properly.

Under typical practice, a skilled engineer is dispatched to the field or the circuit breaker must be returned to the factory to determine the cause and remedy for a malfunction or inferior performance. Due to the high inertia developed in the operating mechanism, there is considerable overshoot and distortion of the parts during operation. Often, analysis, which typically is performed using an expensive camera system, is qualitative rather than quantitative (e.g., it is determined that there is excessive overshoot, but no measurement of the amount of overshoot is provided). This technique for analyzing the operation of such switches is expensive and time consuming, and is highly dependent upon the skill and experience of the tester.

U.S. Pat. No. 5,726,367 discloses a method and apparatus for testing the operation of a spring powered switch mounted in a support frame and operated by an operating mechanism having driven parts actuated by release of charged springs. A recording medium, such as a tape, is applied to one of the driven parts. A fixture mounted to the support frame adjacent the selected driven part supports a marking instrument in contact with the recording medium at a fixed point relative to the support frame. When the charged spring is released, the selected driven part, which carries the recording medium, moves relative to the marking instrument. This produces a trace on the recording medium representing the movement of the selected driven part relative to the fixed point. This trace provides a quantitative record of the movement of the selected driven part which can be used to analyze the performance of the operating mechanism of the switch.

N. Anger et al., "Diagnostics/Monitoring for Medium-Voltage Components and Systems", pp. 1.14.1–1.14.4, discloses the detection of the angle of rotation curve for the breaker shaft of a vacuum circuit breaker's spring-stored-energy operating mechanism. An expert circuit breaker diagnostic system employs temperature sensors, current transformers, and an angle resolver to provide temperatures, opening and closing solenoid coil currents and charging motor currents, and shaft angles to a microprocessor in a continuous on-line operation. Trend analyses are performed using parameters of individual past switching operations with the aid of temperature, voltage and time-compensated classification models.

Although it is known to employ mechanical or electronic sensors for sensing movement of certain operating mechanism components to test a circuit breaker, there remains a need, however, for an improved method and apparatus for accurately testing spring operated switches.

There is a more particular need for such an improved method and apparatus which can be easily used by unskilled personnel.

There is another more particular need for such an improved method and apparatus which is inexpensive and can, therefore, be economically repeated frequently.

SUMMARY OF THE INVENTION

These needs and others are satisfied by the invention which is directed to a method and apparatus for testing the operation of a spring powered switch operated by an operating mechanism having a plurality of driven parts actuated by release of a charged spring. At least one sensor is employed to determine a plurality of variable linear positions of at least one of the driven parts. Operation data is collected for the operating mechanism including the linear positions of the at least one of the driven parts. The operation data is output.

As one aspect of the invention, a method of testing a spring powered switch comprises the steps of: selecting at least one of an operating mechanism's driven parts having a variable linear position, and releasing the operating mechanism's charged spring to actuate the driven parts and to produce linear movement of the selected at least one of the driven parts. At least one sensor is employed to determine a plurality of the linear positions of the selected at least one of the driven parts. Operation data is collected for the operating mechanism including the linear positions of the selected at least one of the driven parts. The operation data is output.

In one embodiment of the invention, a vacuum interrupter stem is employed as the selected one of the driven parts. Motion with respect to time of the vacuum interrupter stem is monitored.

In another embodiment of the invention, a push rod is employed as the selected one of the driven parts. Motion with respect to time of the push rod is monitored.

Preferably, at least one LVDT transducer is employed as the at least one sensor.

As another aspect of the invention, an apparatus for testing a spring powered switch includes a linkage to at least one of an operating mechanism's driven parts having a variable linear position. At least one sensor engages the linkage to determine the linear position of the selected at least one of the driven parts. A means collects operation data for the operating mechanism when the charged spring is released to actuate the driven parts and produce linear movement of the at least one of the driven parts. The operation data includes a plurality of the linear positions of the at least one of the driven parts. A means outputs the operation data.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
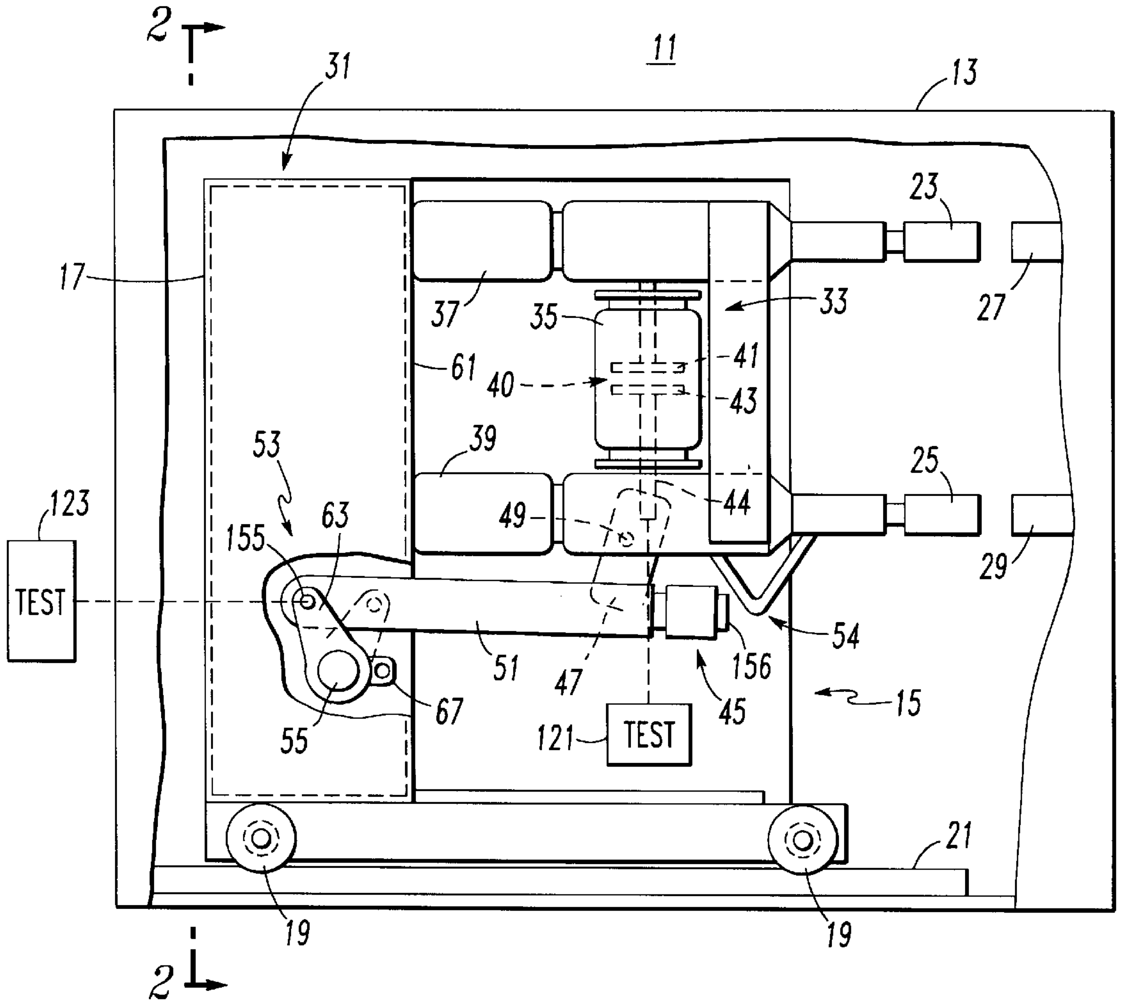
FIG. 1 is a side elevational view, with some parts cut away, of two test circuits, shown in block form, in accordance with the invention for a typical medium voltage circuit breaker shown in the disconnected position.
Figure 2:
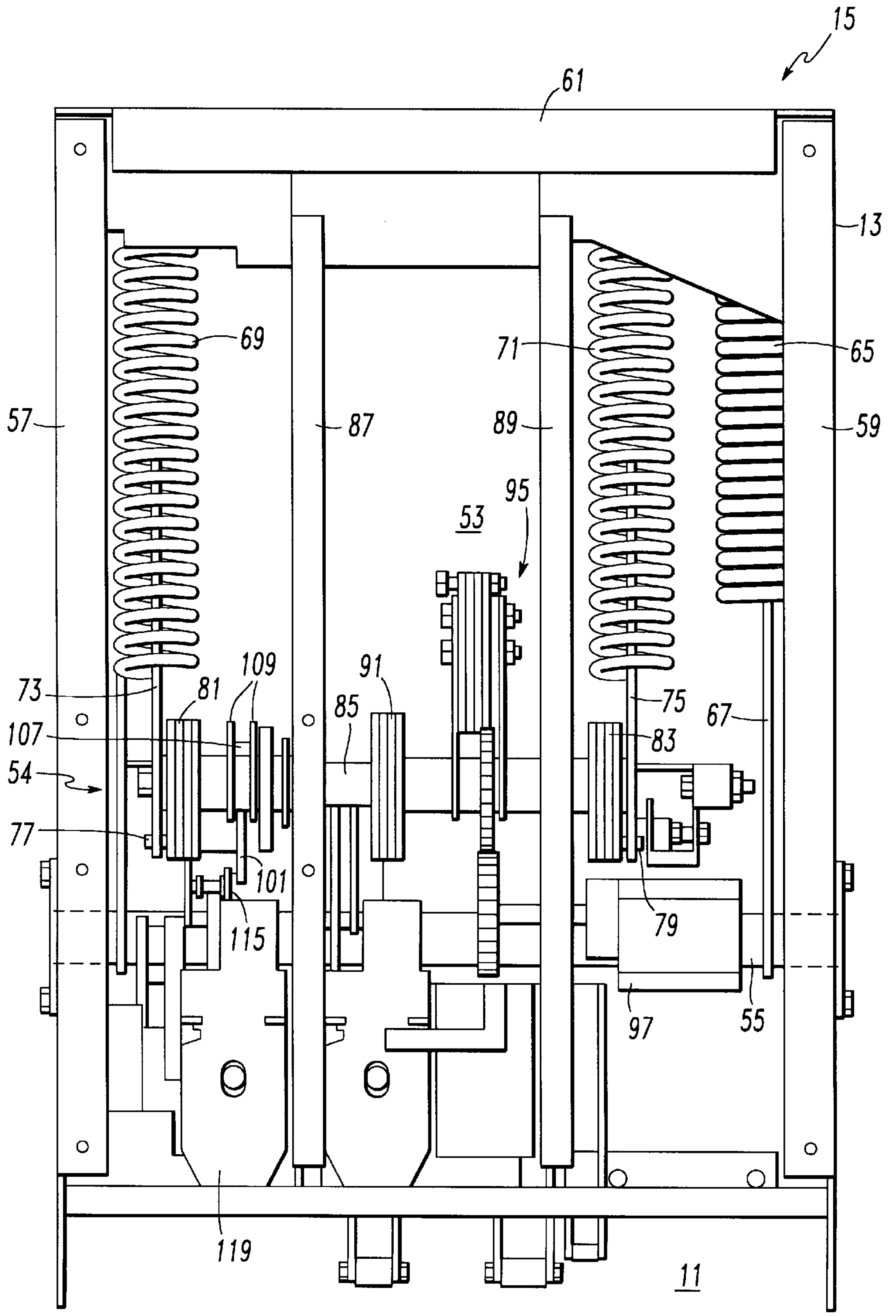
FIG. 2 PRIOR ART
FIG. 2 is a front elevation view of a typical circuit breaker as seen in FIG. 1 with the cover removed.

As shown in FIGS. 1 and 2, a metal-clad or metal-enclosed switch gear apparatus 11 includes a metal cabinet or enclosure 13 for enclosing a spring powered switch, such as the exemplary circuit breaker 15. Examples of the apparatus 11, enclosure 13, and circuit breaker 15 are disclosed in U.S. Pat. No. 5,726,367, which is incorporated by reference herein.

The exemplary circuit breaker 15 is preferably a draw-out three-phase vacuum circuit interrupter having controls on a front face 17 for manually operating the circuit breaker. The circuit breaker 15 has wheels 19 which engage rails 21 for inserting the circuit breaker into and removing it from the enclosure 13. Movement of the circuit breaker 15 along the rails 21 also effects connection and disconnection of terminals 23 and 25 on the circuit breaker with respective line and load terminals 27 and 29 mounted in the enclosure 13, in a well known manner.

The circuit breaker 15 has a front mechanism section 31 adjacent to the front panel 17 and a rear high voltage section 33 containing a vacuum interrupter 35 for each phase. The mechanism and high voltage sections 31,33 are electrically insulated from each other by upper and lower insulators 37 and 39, respectively. Within each vacuum interrupter 35, a pair of separable contacts 40 including a stationary contact 41 and a moveable contact 43 are provided. The contacts 40 are operated between the open position (shown in FIG. 1) and a closed position (not shown) by a linkage 45 which includes a bell crank 47 pivoted at 49 and an insulated push rod 51 extending into the mechanism section 31.

An operating mechanism 53 for opening and closing the separable contacts 40 through the linkage 45 is contained in the mechanism section 31. This operating mechanism 53 operates a number of driven parts 54 (as best shown in FIG. 2) which include a pole shaft 55 which is rotatably journaled in side walls 57 and 59 of a frame or housing 61. A pole arm 63 (FIG. 1) for each phase projects laterally from the pole shaft 55 and is pivotally connected to the associated push rod 51 so that rotation of the pole shaft 55 counter-clockwise or clockwise (with respect to FIG. 1) simultaneously opens or closes, respectively, the separable contacts 40 of each pole. The pole shaft 55 is rotated counter-clockwise (with respect to FIG. 1) to open the contacts 40 by an opening spring 65 (FIG. 2) in the form of a helical tension spring connected at one end to an upper portion of the frame 61 of the mechanism section 31 and at the other end to a lever arm 67 mounted on the pole shaft 55.

The operating mechanism 53 also includes a pair of helical tension closing springs 69 and 71 (FIG. 2) each of which is connected at its upper end to the frame 61 and at its lower end through a spring link 73,75 to an eccentric pivot 77,79 on a spring crank 81,83, respectively. The spring cranks 81 and 83 are mounted on opposite ends of a cam shaft 85 rotatably supported between a pair of spaced supports 87 and 89. Fixed on the cam shaft 85 between the supports 87 and 89 is a closing cam 91 which includes a notch (not shown) in the peripheral cam surface thereof.

The cam shaft 85 is rotated to extend or charge the two closing springs 69 and 71 by a charging mechanism 95 engaging the cam shaft 85 between the closing cam 91 and the support 89. As is well known, this charging mechanism 95 includes an electric motor 97 which can be energized to rotate the cam shaft 85 through a ratchet (not shown). Alternatively, as is known, the cam shaft 85 can be manually rotated to charge the closing springs 69,71 by a charging lever (not shown) which engages the charging mechanism 95. The closing springs 69 and 71 are retained in the charged condition and released by a first, closing spring release (not shown) which includes a closing spring release latch 101 pivotally connected on a shaft (not shown). This closing spring release latch 101 has a latch surface (not shown) which is engaged by a close latch roller 107 supported between a pair of roller support arms 109 fixed to the cam shaft 85.

With the circuit breaker 15 open and the closing springs 69 and 71 discharged, operation of the charging mechanism 95 causes the cam shaft 85 to rotate. This causes the eccentric pivots 77,79 to move downward (with respect to FIG. 2) thereby extending the closing springs 69 and 71. Just after the eccentric pivots 77,79 carry the lines of action of the closing springs 69,71 through the center of the cam shaft 85, the closing latch roller 107 engages the latch surface (not shown) on the closing spring release latch 101. The tendency of the closing spring 69,71 to continue the rotation in this closing operation is blocked by the engagement of an extension (not shown) on the release latch 101 with a fixed pin (not shown).

The release latch 101 is operated by a release lever 115 pivotally connected at one end to an arm (not shown) on the pole shaft 55. The other end of the release lever 115 rests on a close clapper 119. The close clapper 119 in turn is pivotally supported on a bracket (not shown) which also supports a close solenoid (not shown). Rotation of the close clapper 119 about a pivot axis, either manually by pressing on the lower end of the clapper, or automatically by energization of the close solenoid, causes rotation of the release lever 115. The release lever 115 engages a projection (not shown) on the closing spring release latch 101 which is rotated until the close latch roller 107 slips off of the latch surface (not shown). This permits the closing springs 69 and 71 to rapidly rotate the cam shaft 85. In turn, this results in rotation of the pole shaft 55 to close the separable contacts 40 of the circuit breaker 15. The force generated by two closing springs 69,71 is required as they not only operate the mechanism 53 to close the separable contacts 40, but they also charge the opening spring 65.

As discussed, the separable contacts 40 must be rapidly opened and closed. The sizeable spring forces required to do this must be absorbed which results in considerable distortion of the driven parts 54. This combination of factors makes it difficult to observe and evaluate the operation of the circuit breaker 15. The present invention provides a quantitative evaluation of circuit breaker performance.

Figure 3:
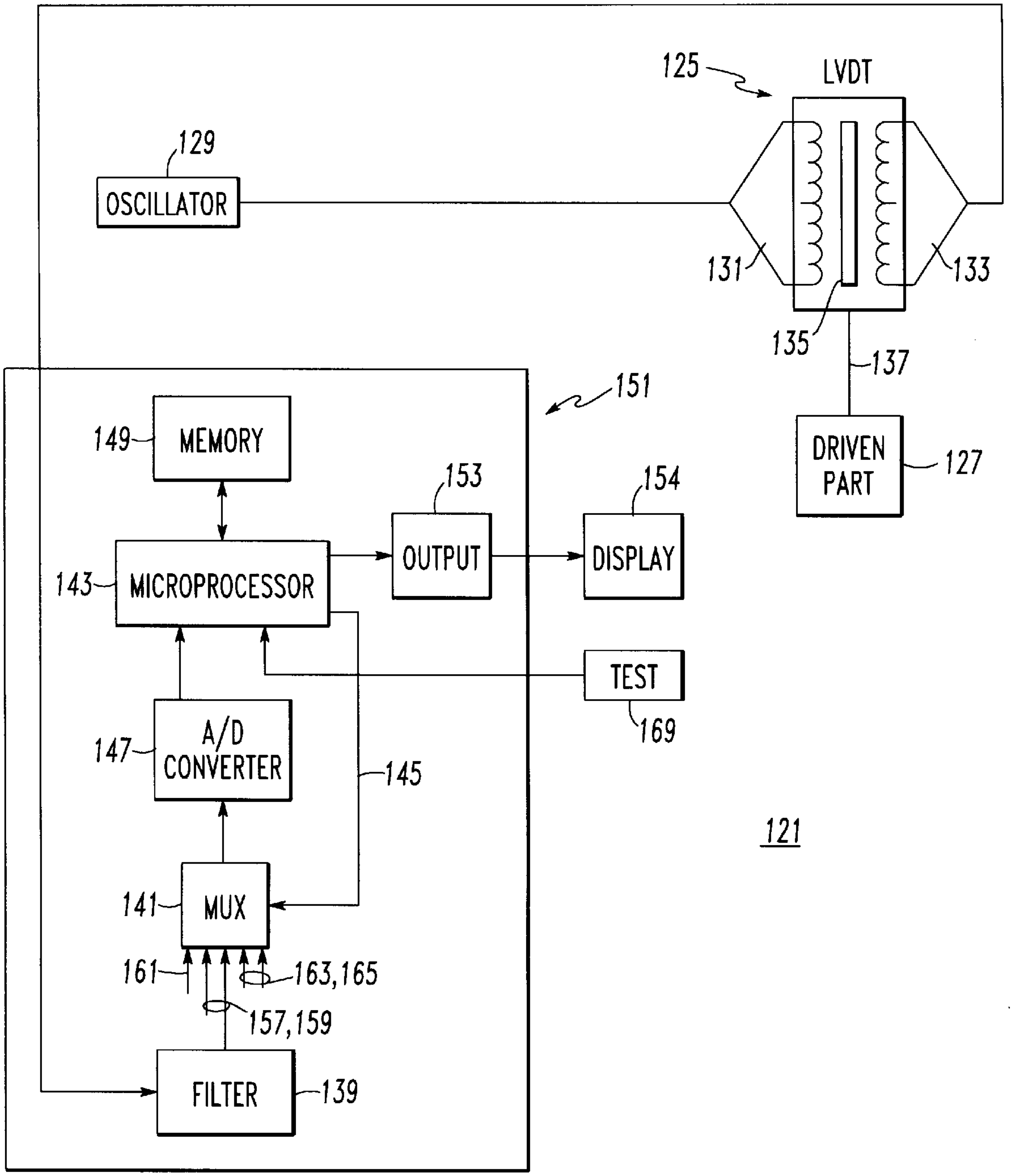
FIG. 3 is a block diagram of one of the test circuits of FIG. 1.

FIG. 3 is a block diagram of one of the test circuits 121,123 of FIG. 1. A linear variable differential transformer (LVDT), generally referred to as 125, monitors the position of a driven part 127. An oscillator 129 supplies a sinusoidal voltage to a primary coil 131 of the LVDT 125 for inducing a voltage on a secondary coil 133 of the LVDT 125, which causes a current to be induced on the secondary coil 133. A movable core 135 of the LVDT 125 functions to vary the voltage induced on the secondary coil 133. The core 135 is connected to the driven part 127 via a linkage 137, and moves in direct correlation to the movement of the driven part 127. In turn, the secondary current varies linearly with the movement of the core 135.

During normal operation, the present position of driven part 127 is indicated by the secondary current of the LVDT

125. This secondary current is received by a filter 139 which filters and passes the signal to a multiplexer 141. The multiplexer 141 functions to select one input from a plurality of inputs, in this case the present position signal of the LVDT 125, according to a signal given by a microprocessor 143 via line 145. The multiplexer 141 passes the signal to an A/D converter 147, which digitizes the signal and passes it to the microprocessor 143 for storage in memory 149.

An apparatus 121 for testing the circuit breaker 15 of FIG. 1 includes one or more linkages 137 (FIG. 3) to one or more driven parts 127, such as 54 of the operating mechanism 53 of FIG. 1. The driven parts 127 have a variable linear position and are actuated by release of the charged springs 69,71 of FIG. 2. The LVDT sensor 125 engages the linkage 137 to determine the linear position of the driven part 127, such as the vacuum interrupter stem 44 of FIG. 1. It will be appreciated that the test apparatus 123 of FIG. 1 also employs an LVDT sensor (not shown) to engage a linkage (not shown) to determine the linear position of the insulated push rod 51 of FIG. 1. It will also be appreciated that a wide range of mounting and interface mechanisms (e.g., bracket mounted, fastened, attached, glued, magnetically mounted, and non-interface mounted) for deploying the test apparatus 121,123 with the circuit breaker 15.

The microprocessor 143 of the processing unit 151 collects operation data for the operating mechanism 53 when either the charged springs 69,71 are released or the operating mechanism is tripped to actuate the driven parts 54,127 and produce linear movement thereof. The operation data includes a plurality of the linear positions of the driven parts 127 as read by the microprocessor 143 from the A/D converter 147. In turn, the microprocessor 143 outputs the operation data through the output interface 153 for display 154.

A method of testing the circuit breaker 15 of FIG. 1 includes selecting one or more of the driven parts 54,127 having a variable linear position; releasing the charged springs 69,71 to actuate the driven parts and to produce linear movement of the selected driven parts; employing one or more sensors 125 to determine a plurality of the linear positions of the selected driven parts; collecting operation data for the operating mechanism 53 including the linear positions of the selected driven parts; and outputting the operation data.

The exemplary circuit breaker 15 of FIG. 1 is preferably assembled on an assembly fixture. Part of the electrical/mechanical testing of the circuit breaker 15 is the verification of performance. The method and apparatus of the invention accomplish this verification of performance. Preferably, a wide range of aspects of the performance of each circuit breaker 15 are individually verified. The processing unit 151 automatically collects the operation data while the exemplary circuit breaker 15 is operating. This operation data may then be employed to monitor the efficacy of the circuit breaker 15 operation. The preferred testing method monitors the circuit breaker 15 in four places: (1) motion/travel of the vacuum interrupter stem 44; (2) motion/travel of the push rod 51 inside of the operating mechanism 53; (3) motion/travel of the cam shaft 85 (FIG. 2) of the operating mechanism 53; and (4) performance of the motor 97 (FIG. 2).

First, the motion and travel of the vacuum interrupter stem 44 (below contact 43 of FIG. 1) is monitored to evaluate the motion and travel of the separable contacts 40 and, in particular, the moveable contact 43. The LVDT transducer 125 of the test apparatus 121 of FIG. 3 is employed to determine voltage (V), which is proportional to displacement (D), and, thus, displacement in terms of opening and closing positions, and action in terms of action time, velocity, and acceleration. This transducer 125 is placed on the bottom of the circuit breaker 15 under the linkage 45.

Second, the motion and travel of the push rod 51 (at pole arm 63 near pin 155), which moves to the right (with respect to FIG. 1) to close the separable contacts 40, is also monitored to evaluate the motion and travel of the separable contacts 40. In a like manner as the LVDT transducer 125 (FIG. 3), an LVDT transducer (not shown) of test apparatus 123 is employed to determine voltage (V) proportional to displacement (D) and, thus, the motion of the push rod 51. In turn, this motion is actually the motion of several parts including the push rod 51, contact spring (not shown) of linkage 45, hammer weight 156, and links (not shown) of a coupling mechanism for coupling the cam shaft 85 (FIG. 2) to the pole shaft 55, with the motion broken down into: opening and closing positions, action time, action speed or velocity (speed of the operating mechanism 53 at the pole shaft 55), and action acceleration.

Third, the motion of the closing cam 91 (FIG. 2) is monitored to determine the speed, overshoot and rebound characteristics of cam shaft 85 as a result of discharge of closing springs 69,71. While the cam shaft 85 typically has a relatively small diameter (e.g., in the exemplary embodiment, about 1"), the spring crank 81,83 typically has a relatively larger diameter (e.g., in the exemplary embodiment, about 3"). Preferably, the closing cam motion is monitored by employing a suitable sensor (not shown) for the spring cranks 81,83. The closing cam motion is determined by the motion of several parts including the cam shaft 85, moveable contact 43 of vacuum interrupter 35 (FIG. 1), push rod 51, pole shaft 55, opening spring 65, and closing springs 69,71. This motion, in turn, is broken down into: travel distance, opening and closing positions, action time, action speed or velocity, and action acceleration.

Finally, the electric motor 97 (FIG. 2) is monitored to determine its voltage and current with respect to time. In turn, these are monitored and plotted over time of operation, thereby creating a time history of the operation. Preferably, the microprocessor, such as 143 of FIG. 3, includes a suitable timer (not shown) for measuring time and employs the A/D 147 for the LVDT outputs, motor voltage and motor current. The microprocessor, then, determines the time (t); open and closed displacements (D); and actions in terms of time (t), speed ($s=V=dD/dt$), and acceleration ($a=dV/dt$). The multiplexer 141 preferably includes a plurality of inputs 157,159 to receive the LVDT signals, inputs 161 for the output of the sensor for the spring cranks 81,83, and inputs 163,165 for the motor current and voltage signals.

Figure 4:
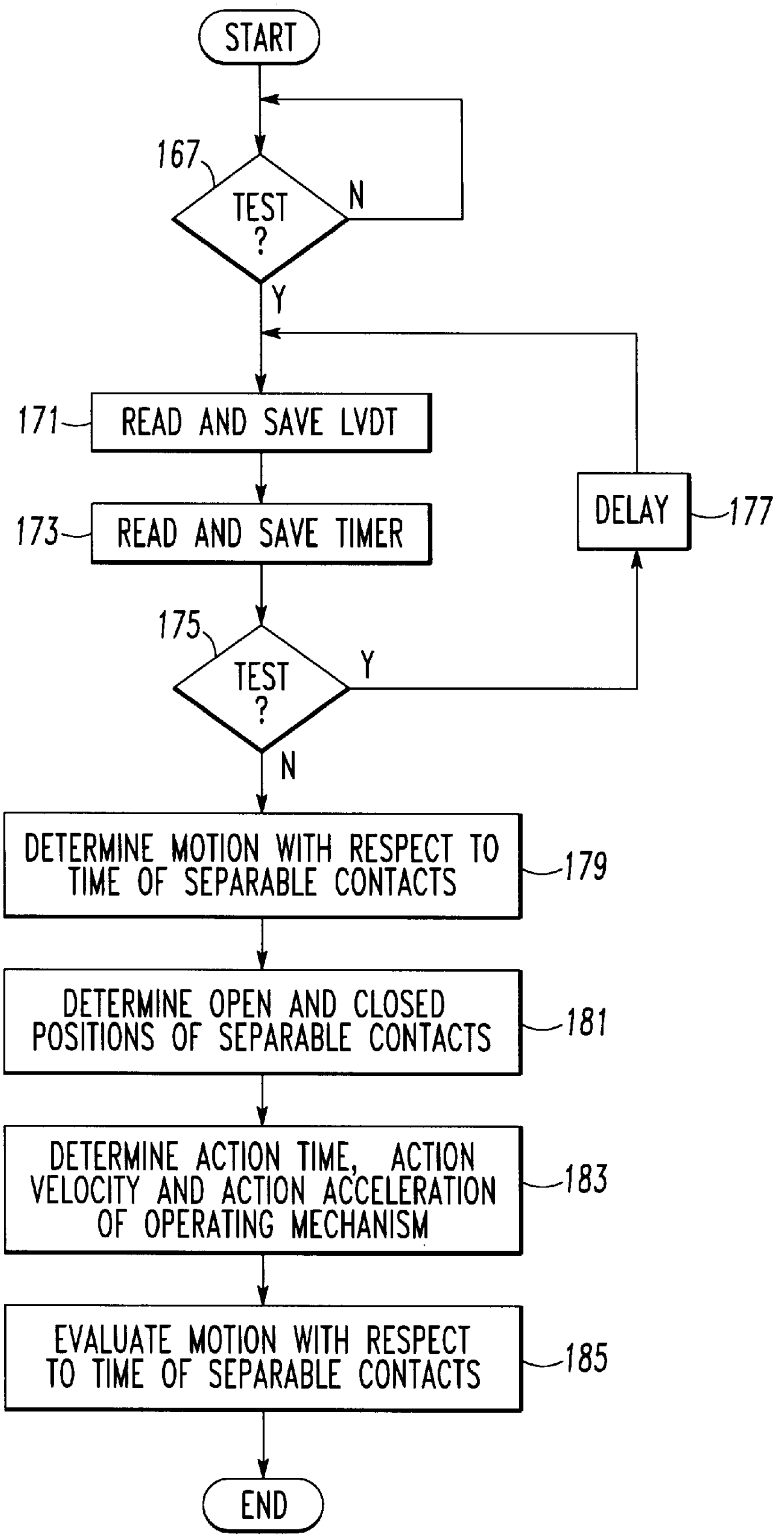
FIG. 4 is a firmware flow chart for the microprocessor of FIG. 3.

Referring to FIG. 4, a firmware flow chart for the microprocessor 143 of FIG. 3 is illustrated. At 167, if a test signal 169 (FIG. 3) is active, then the separable contacts 40 are to be closed by the operating mechanism 53. At 171, the microprocessor 143 determines the present position of the driven part, such as push rod 51 or vacuum interrupter stem 44, by reading the secondary current of the LVDT 125 (as discussed above in connection with FIG. 3) and saving the value in memory 149. At 173, the microprocessor 143 determines the present time by reading a microprocessor timer (not shown) and saving the value in memory 149. Next, at 175, if the test signal 169 is still active, then after a suitable delay, at 177, further sampling is conducted at 171 and 173. Steps 171, 173, 175 and 177 permit the microprocessor 143 to monitor motion with respect to time of the driven part and to, thereby, provide the operation data for the operating mechanism 53.

Otherwise, at 179, if the test signal 169 is not active, then the sampling period is complete and the microprocessor 143 determines motion with respect to time of the separable contacts 40 from the motion with respect to time of the driven part (e.g., by employing suitable calculations based upon the configuration of the operating mechanism 53, look-up tables, historical data). It will be appreciated that the former motion, which is relatively difficult to measure, may, thus, be readily determined from the latter motion, which is relatively easy to measure. Next, at 181, based upon the initial and final positions of the separable contacts 40 from step 179, the open position and closed position of the separable contacts 40 is determined. At 183, action time, action velocity, and action acceleration of the operating mechanism 53 is determined from the motion with respect to time of the driven part. Finally, at 185, motion with respect to time of the separable contacts 40 is evaluated and the operation data is output through the output interface 153.

Although a medium voltage vacuum interrupter 15 is disclosed as an exemplary embodiment of the invention, it will be appreciated that the teachings of the invention are applicable to other electrical switching devices such as, for example, other switching devices, fuse switches, other circuit breakers (e.g., air circuit breakers, miniature circuit breakers, and other mechanism devices).

The invention allows for automatic, hands-free, electronic collection of operation data.

Although an exemplary LVDT 125 is disclosed, it will be appreciated that a wide range of data collection mechanisms may be employed such as, for example, position, velocity, and acceleration sensors employing suitable measurement techniques (e.g., mechanical, resistive, LED).

The improved method and apparatus provides operation data, as a record of the operation of the circuit breaker 15, which may be automatically stored and retrieved, manipulated, computer modified, or combined with other data. The operation data, in turn, may be easily read and maintained at the circuit breaker 15 and/or transported for remote analysis and/or storage.

While for clarity of disclosure reference has been made herein to the output interface 153 for output and display 154 of operation data, it will be appreciated that the operation data may be stored, printed on hard copy, charted, plotted, graphed, manipulated, computer modified, or combined with other data. All such processing shall be deemed to fall within the terms "output" or "outputting" as employed herein.

In the exemplary embodiment, the operation data is stored in the memory 149 of microprocessor 143 as digital values corresponding to a suitable time reference. In this manner, the operation data may be readily transformed into charts, plots or graphs. Preferably, the operation data pertains to a wide variety of aspects of the performance of the exemplary circuit breaker 15 and may be accessed in a user friendly manner.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A method of testing a spring powered switch operated by an operating mechanism having a plurality of driven parts actuated by release of a charged spring, said method comprising the steps of:

selecting at least one of said driven parts having a variable linear position;

releasing said charged spring to actuate said driven parts and to produce linear movement of said selected at least one of said driven parts;

employing at least one sensor to determine a plurality of the linear positions of said selected at least one of said driven parts;

collecting operation data for said operating mechanism including the linear positions of said selected at least one of said driven parts; and outputting said operation data.

2. The method of claim 1 including:

employing at least one LVDT transducer as said at least one sensor.

3. The method of claim 1 including:

employing a vacuum interrupter stem as said selected one of said driven parts.

4. The method of claim 3 including:

monitoring motion with respect to time of said vacuum interrupter stem.

5. The method of claim 4 including:

operating separable contacts with said operating mechanism; and evaluating motion with respect to time of the separable contacts from said motion with respect to time of said vacuum interrupter stem.

6. The method of claim 4 including:

operating separable contacts with said operating mechanism; and determining opening and closing positions of the separable contacts from said motion with respect to time of said vacuum interrupter stem.

7. The method of claim 6 including:

determining at least one of action time, action velocity, and action acceleration of the operating mechanism from said motion with respect to time of said vacuum interrupter stem.

8. The method of claim 1 including:

collecting a plurality of pairs of:

one of the linear positions of said selected at least one of said driven parts, and a corresponding time as said operation data for said operating mechanism.

9. The method of claim 1 including:

selecting another one of said driven parts having a variable linear position; and employing another sensor to determine a plurality of the linear positions of said selected another one of said driven parts.

10. The method of claim 1 including:

employing a push rod as said selected one of said driven parts.

11. The method of claim 10 including:

selecting another one of said driven parts having a variable linear position; and employing another sensor to determine a plurality of the linear positions of said selected another one of said driven parts.

12. The method of claim 10 including:

employing at least one LVDT transducer as said at least one sensor.

13. The method of claim 10 including:

monitoring motion with respect to time of said push rod.

14. The method of claim 13 including:

operating separable contacts with said operating mechanism; and evaluating motion with respect to time of the separable contacts from said motion with respect to time of said push rod.

15. The method of claim 13 including:

determining an opening position and a closing position of the separable contacts.

16. The method of claim 13 including:

determining at least one of action time, action velocity, and action acceleration of the operating mechanism from said motion with respect to time of said push rod.

17. An apparatus for testing a spring powered switch operated by an operating mechanism including a plurality of driven parts having a variable linear position and actuated by release of a charged spring, said apparatus comprising:

at least one linkage to at least one of said driven parts;

at least one sensor engaging said linkage to determine the linear position of at least one of said driven parts;

means for collecting operation data for said operating mechanism when said charged spring is released to actuate said driven parts and produce linear movement of said at least one of said driven parts, said operation data including a plurality of the linear positions of said at least one of said driven parts; and means for outputting the operation data.

18. The apparatus of claim 17 wherein said at least one sensor is at least one LVDT transducer.

19. The apparatus of claim 17 wherein said at least one of said driven parts is a push rod.

20. The apparatus of claim 19 wherein said means for collecting operation data for said operating mechanism includes means for monitoring motion with respect to time of said push rod.

21. The apparatus of claim 17 wherein said at least one of said driven parts includes a vacuum interrupter stem and a push rod; and wherein said at least one sensor includes a pair of LVDT transducers for the vacuum interrupter stem and the push rod.

22. The apparatus of claim 17 wherein said at least one of said driven parts is a vacuum interrupter stem.

23. The apparatus of claim 22 wherein said means for collecting operation data for said operating mechanism includes means for monitoring motion with respect to time of said vacuum interrupter stem.

* * * * *